US012075214B2

(12) United States Patent
Olah

(10) Patent No.: US 12,075,214 B2
(45) Date of Patent: Aug. 27, 2024

(54) HEARING AID AND METHOD FOR USE OF SAME

(71) Applicant: Texas Institute of Science, Inc., Richardson, TX (US)

(72) Inventor: Laslo Olah, Richardson, TX (US)

(73) Assignee: Texas Institute of Science, Inc., Richardson, TX (US)

( * ) Notice: Subject to any disclaimer, the term of this patent is extended or adjusted under 35 U.S.C. 154(b) by 0 days.

(21) Appl. No.: 18/456,983

(22) Filed: Aug. 28, 2023

(65) Prior Publication Data

US 2023/0403515 A1 Dec. 14, 2023

Related U.S. Application Data

(63) Continuation of application No. 17/487,377, filed on Sep. 28, 2021, now Pat. No. 11,743,660, which is a (Continued)

(51) Int. Cl.
*H04R 25/00* (2006.01)
*H04R 1/10* (2006.01)

(52) U.S. Cl.
CPC ........... *H04R 25/40* (2013.01); *H04R 1/1041* (2013.01); *H04R 1/105* (2013.01); *H04R 25/353* (2013.01);
(Continued)

(58) Field of Classification Search
CPC ...... H04R 25/40; H04R 1/1041; H04R 1/105; H04R 25/353; H04R 25/505;
(Continued)

(56) References Cited

U.S. PATENT DOCUMENTS 4,881,616 A 11/1989 Janssen
5,987,147 A 11/1999 Nishimoto
(Continued)

FOREIGN PATENT DOCUMENTS

CN 112237009 1/2021
EP 3735782 11/2020
(Continued)

OTHER PUBLICATIONS

International Preliminary Report on Patentability—PCT/US2019/012550.

(Continued)

*Primary Examiner* — Tuan D Nguyen
(74) *Attorney, Agent, or Firm* — Scott Griggs; Griggs Bergen LLP

(57) ABSTRACT

A hearing aid and method for use of the same are disclosed. In one embodiment, the hearing includes a body that at least partially conforms to the contours of the external ear and is sized to engage therewith. Various electronic components are contained within the body, including an electronic signal processor that is programmed with a preferred hearing range, which may be an about 10 Hz frequency to an about 30 Hz frequency range of sound corresponding to highest hearing capacity of a patient. Sound received at the hearing aid is converted to the preferred hearing range prior to output.

20 Claims, 2 Drawing Sheets

Related U.S. Application Data continuation of application No. 16/959,972, filed as application No. PCT/US2019/012550 on Jan. 7, 2019, now Pat. No. 11,134,347.

(60) Provisional application No. 62/613,804, filed on Jan. 5, 2018.

(52) U.S. Cl.
CPC ..... *H04R 25/505* (2013.01); *H04R 2225/021* (2013.01)

(58) Field of Classification Search
CPC .......... H04R 2225/021; H04R 2225/43; H04R 2430/03; H04R 25/552; H04R 25/405
See application file for complete search history.

(56) References Cited

U.S. PATENT DOCUMENTS

| | | | | |
|---|---|---|---|---|
| 6,009,183 | A | 12/1999 | Taenzer | |
| 7,113,589 | B2 | 9/2006 | Mitchler | |
| 8,565,460 | B2 | 10/2013 | Takagi et al. | |
| 8,761,421 | B2 | 6/2014 | Apfel | |
| 9,232,322 | B2 | 1/2016 | Fang | |
| 9,344,814 | B2 | 5/2016 | Rasmussen | |
| 9,468,401 | B2 * | 10/2016 | Van Hasselt | H04R 25/35 |
| 9,712,928 | B2 | 7/2017 | Pedersen et al. | |
| 10,181,328 | B2 | 1/2019 | Jensen et al. | |
| 10,433,082 | B2 | 10/2019 | Vonianthen | |
| 10,880,658 | B1 | 12/2020 | Olah | |
| 10,893,370 | B1 | 1/2021 | Olah | |
| 10,993,047 | B2 | 4/2021 | Olah | |
| 11,095,992 | B2 | 8/2021 | Olah | |
| 11,102,589 | B2 | 8/2021 | Olah | |
| 11,109,170 | B1 | 8/2021 | Olah | |
| 11,115,759 | B1 | 9/2021 | Olah | |
| 11,128,963 | B1 | 9/2021 | Olah | |
| 2004/0073138 | A1 | 4/2004 | Greco | |
| 2005/0004691 | A1 | 1/2005 | Edwards | |
| 2005/0245221 | A1 | 11/2005 | Beyer | |
| 2007/0230711 | A1 | 10/2007 | Hasler | |
| 2008/0004691 | A1 | 1/2008 | Weber | |
| 2008/0015463 | A1 | 1/2008 | Goldstein | |
| 2011/0188685 | A1 | 8/2011 | Sheikh | |
| 2012/0106762 | A1 | 5/2012 | Kornagel | |
| 2012/0121102 | A1 | 5/2012 | Jang | |
| 2013/0142369 | A1 | 6/2013 | Zhang | |
| 2013/0223661 | A1 | 8/2013 | Uzuanis | |
| 2014/0086417 | A1 | 3/2014 | Hansen | |
| 2014/0314261 | A1 | 10/2014 | Selig | |
| 2015/0003635 | A1 | 1/2015 | Baker | |
| 2015/0023512 | A1 | 1/2015 | Shennib | |
| 2015/0023535 | A1 | 1/2015 | Shennib | |
| 2016/0338622 | A1 | 11/2016 | Chen | |
| 2016/0350821 | A1 | 12/2016 | Shennib | |
| 2017/0180886 | A1 | 6/2017 | Van Der Loo | |
| 2018/0035216 | A1 | 2/2018 | Van Hasselt | |
| 2018/0078422 | A1 | 3/2018 | Dierenbach | |
| 2018/0207167 | A1 | 7/2018 | Dyhrfjeld-Johnsen | |
| 2019/0090073 | A1 | 3/2019 | Wendt et al. | |
| 2019/0253818 | A1 | 8/2019 | Vonianthen | |
| 2020/0268260 | A1 | 8/2020 | Bao | |
| 2021/0006909 | A1 | 1/2021 | Olah | |
| 2021/0006911 | A1 | 1/2021 | Olah | |
| 2021/0006913 | A1 | 1/2021 | Olah | |
| 2021/0014621 | A1 | 1/2021 | Olah | |
| 2021/0297791 | A1 | 9/2021 | Olah | |

FOREIGN PATENT DOCUMENTS

| | | |
|---|---|---|
| KR | 20170026786 | 3/2017 |
| WO | 2016188270 | 12/2016 |
| WO | 2019136382 | 7/2019 |

OTHER PUBLICATIONS

International Search Report—PCT/US2019/012550.
International Search Report—PCT/US2020/051978.
International Search Report—PCT/US2021/012955.
International Search Report—PCT/US2021/029414.

* cited by examiner

HEARING AID AND METHOD FOR USE OF SAME

PRIORITY STATEMENT & CROSS-REFERENCE TO RELATED APPLICATIONS

This application is a continuation of U.S. patent application Ser. No. 17/487,377 entitled "Hearing Aid and Method for Use of Same" filed on Sep. 28, 2021 in the name of Laslo Olah; which is a continuation of U.S. patent application Ser. No. 16/959,972 entitled "Hearing Aid and Method for Use of Same" filed on Jul. 2, 2020 in the name of Laslo Olah, now U.S. Pat. No. 11,134,347 issued on Sep. 28, 2021; which is a National Entry application of International Application No. PCT/US2019/012550 entitled "Hearing Aid and Method for Use of Same" filed on Jan. 7, 2019 in the name of Laslo Olah; which claims priority from U.S. Patent Application Ser. No. 62/613,804 entitled "Hearing Aid and Method for Use of Same" filed on Jan. 5, 2018, in the name of Laslo Olah; all of which are hereby incorporated by reference, in entirety, for all purposes.

TECHNICAL FIELD OF THE INVENTION

This invention relates, in general, to hearing aids and, in particular, to hearing aids and methods for use of the same that provide signal processing to enhance speech and sound intelligibility.

BACKGROUND OF THE INVENTION

Hearing loss can affect anyone at any age, although elderly adults more frequently experience hearing loss. Untreated hearing loss is associated with lower quality of life and can have far-reaching implications for the individual experiencing hearing loss as well as those close to the individual. As a result, there is a continuing need for improved hearing aids and methods for use of the same that enable patients to better hear conversations and the like.

SUMMARY OF THE INVENTION

It would be advantageous to achieve a hearing aid and method for use of the same that would improve upon existing limitations in functionality with respect to frequency range of sound output. It would also be desirable to enable a mechanical and electronics-based solution that would provide enhanced performance and improved usability. To better address one or more of these concerns, a hearing aid and method for use of the same are disclosed. In one embodiment, the hearing aid includes a body that at least partially conforms to the contours of the external ear and is sized to engage therewith. Various electronic components are contained within the body, including an electronic signal processor that is programmed with a preferred hearing range, which may be an about 10 Hz frequency to an about 30 Hz frequency range of sound corresponding to highest hearing capacity of a patient. Sound received at the hearing aid is converted to the preferred hearing range prior to output. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
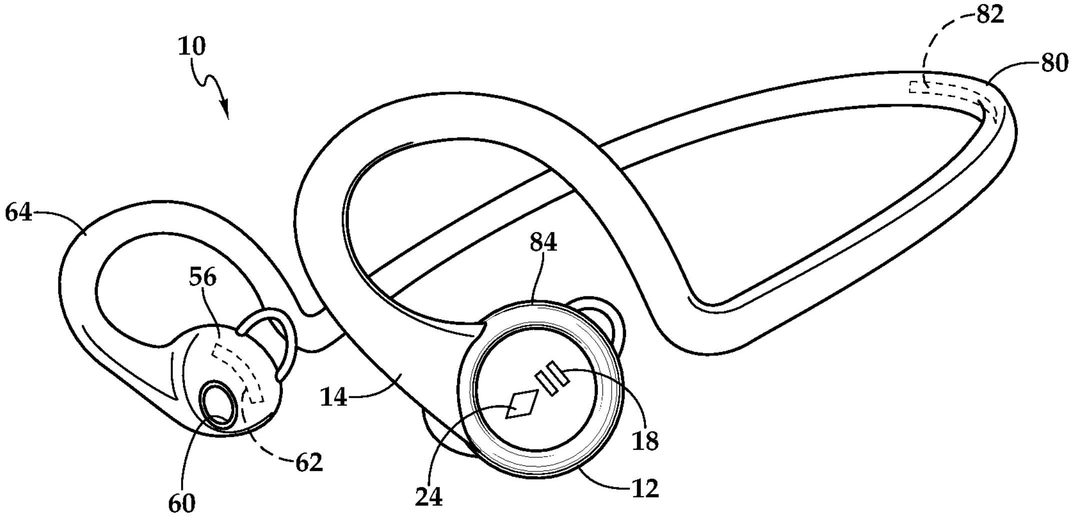
FIG. 1 is a front left perspective diagram of one embodiment of a hearing aid according to the teachings presented herein.
Figure 2:
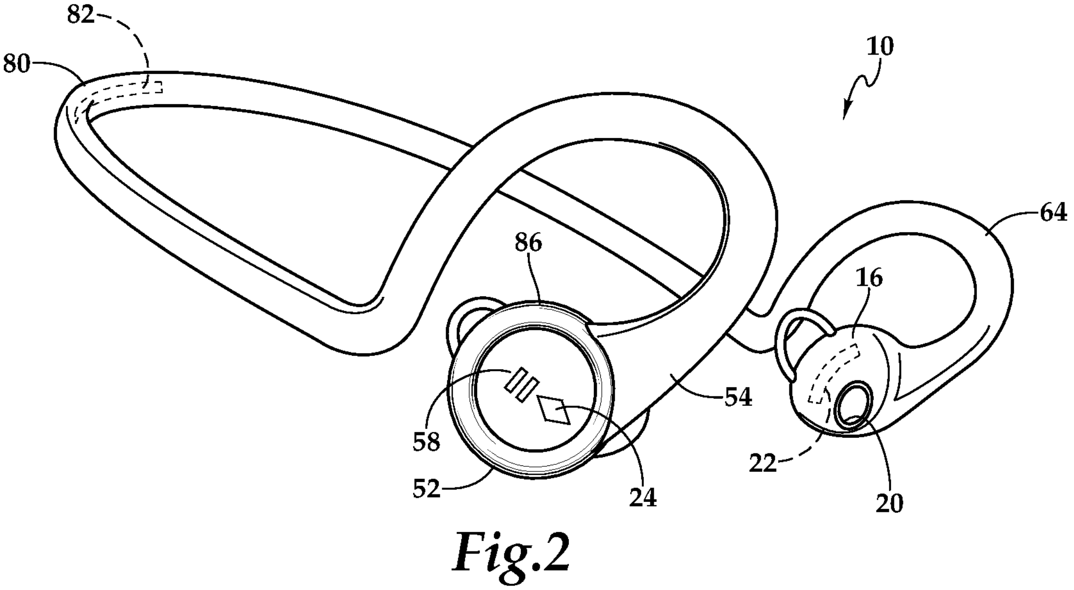
FIG. 2 is a front right perspective diagram of one embodiment of the hearing aid depicted in FIG. 1.

Referring initially to FIG. 1 and FIG. 2, therein is depicted one embodiment of a hearing aid, which is schematically illustrated and designated 10. As shown, in the illustrated embodiment, the hearing aid 10 includes a left body 12 having an ear hook 14 extending from the left body 12 to an ear mold 16. The left body 12 and the ear mold 16 may each at least partially conform to the contours of the external ear and sized to engage therewith. By way of example, the left body 12 may be sized to engage with the contours of the ear in a behind-the-ear-fit. The ear mold 16 may be sized to be fitted for the physical shape of a patient's ear. The ear hook 14 may include a flexible tubular material that propagates sound from the body 12 to the ear mold 16. A microphone 18, which gathers sound and converts the gathered sound into an electrical signal, is located on the left body 12. An opening 20 within the ear mold 16 permits sound traveling through the ear hook 14 to exit into the patient's ear. An internal compartment 22 provides space for housing electronics, which will be discussed in further detail hereinbelow. Various controls 24 provide a patient interface with the hearing aid 10 on the left body 12 of the hearing aid 10.

As also shown, the hearing aid 10 includes a right body 52 having an ear hook 54 extending from the right body 52 to an ear mold 56. The right body 52 and the ear mold 56 may each at least partially conform to the contours of the external ear and sized to engage therewith. By way of example, the right body 52 may be sized to engage with the contours of the ear in a behind-the-ear-fit. The ear mold 56 may be sized to be fitted for the physical shape of a patient's ear. The ear hook 54 may include a flexible tubular material that propagates sound from the right body 52 to the ear mold 56. A microphone 58, which gathers sound and converts the gathered sound into an electrical signal, is located on the right body 52. An opening 60 within the ear mold 16 permits sound traveling through the ear hook 54 to exit into the patient's ear. An internal compartment 62 provides space for housing electronics, which will be discussed in further detail hereinbelow. Various controls 64 provide a patient interface with the hearing aid 10 on the right body 52 of the hearing aid 10. It should be appreciated that the controls 24, 64 and other components of the left and right bodies 12, 52 may be at least be partially integrated and consolidated.

In one embodiment, the left and right bodies 12, 52 are connected at the respective ear hooks 14, 54 by a band member 80 which configured to partially circumscribing a head of the patient. A compartment 82 within the band member 80 may provide space for electronics and the like. Additionally, the hearing aid 10 may include left and right earpiece covers 84, 86 respectively positioned exteriorly to the left and right bodies 12, 52. Each of the left and right earpiece covers 84, 86 isolate noise to block out interfering outside noises. To add further benefit, in one embodiment, the microphone 18 in the left body 12 and the microphone 58 in the right body 52 may cooperate to provide directional hearing.

Figure 3:
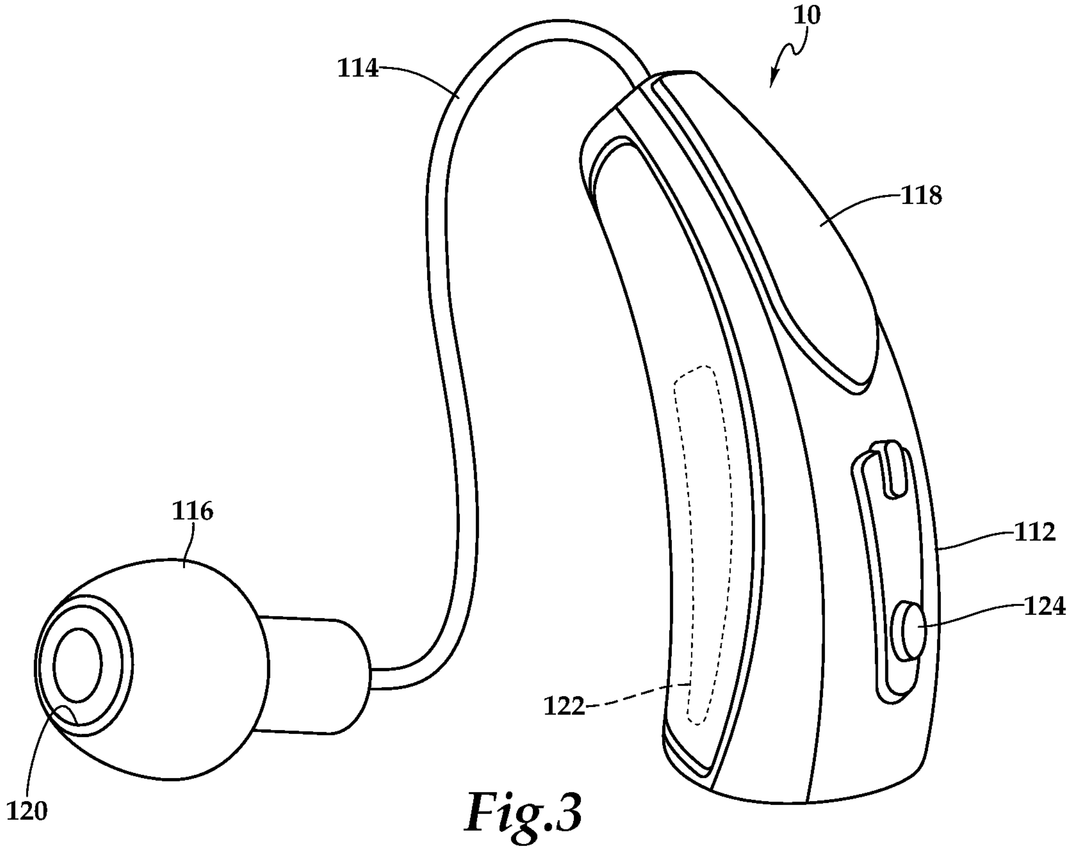
FIG. 3 is a front perspective diagram of another embodiment of a hearing aid according to the teachings presented herein.

Referring to FIG. 3, therein is depicted another embodiment of the hearing aid 10. As shown, in the illustrated embodiment, the hearing aid 10 includes a body 112 having an ear hook 114 extending from the body 112 to an ear mold 116. The body 112 and the ear mold 116 may each at least partially conform to the contours of the external ear and sized to engage therewith. By way of example, the body 112 may be sized to engage with the contours of the ear in a behind-the-ear-fit. The ear mold 116 may be sized to be fitted for the physical shape of a patient's ear. The ear hook 114 may include a flexible tubular material that propagates sound from the body 112 to the ear mold 116. A microphone 118, which gathers sound and converts the gathered sound into an electrical signal, is located on the body 112. An opening 120 within the ear mold 116 permits sound traveling through the ear hook 114 to exit into the patient's ear. An internal compartment 122 provides space for housing electronics, which will be discussed in further detail hereinbelow. Various controls 124 provide a patient interface with the hearing aid 10 on the body 112 of the hearing aid 10.

Figure 4:
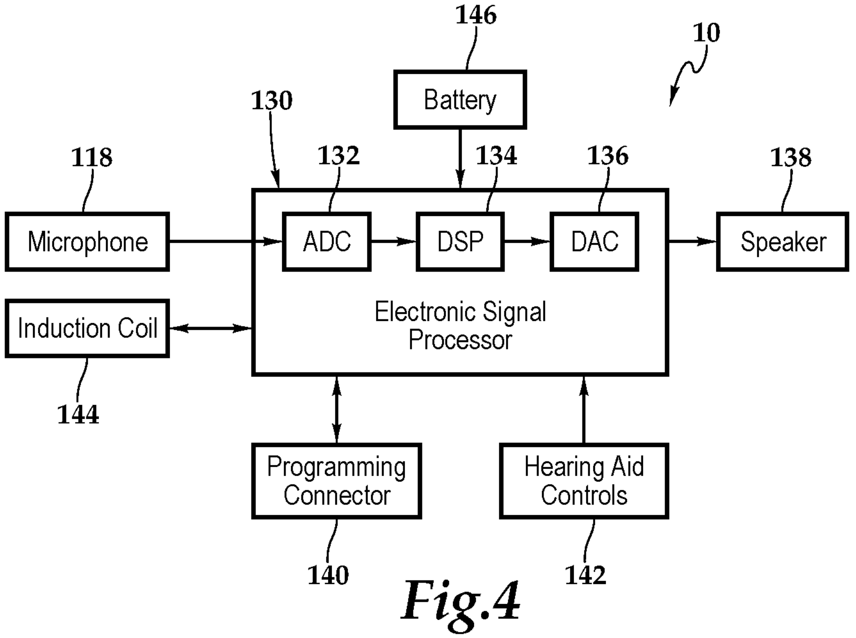
FIG. 4 is a functional block diagram depicting one embodiment of the hearing aid shown herein.

Referring now to FIG. 4, an illustrative embodiment of the internal components of the hearing aid 10 is depicted. By way of illustration and not by way of limitation, the hearing aid 10 depicted in the embodiment of FIG. 3 is presented. It should be appreciated, however, that the teachings of FIG. 4 equally apply to the embodiment of FIGS. 1 and 2. As shown, in one embodiment, within the internal compartment 122 of the body 112, an electronic signal processor 130 is housed. In order to measure, filter, compress, and generate, for example, continuous real-world analog signals in form of sounds, the electronic signal processor 130 may include an analog-to-digital converter 132, a digital signal processor 134, and a digital-to-analog converter 136. The electronic signal processor 130, including the digital signal processor embodiment, may have memory accessible to a processor. The microphone 118, a speaker 138, various controls 124, such as a programming connector 140 and hearing aid controls 142, induction coil 144, and battery 146 are also housed within the hearing aid 10. As shown, a signaling architecture communicatively interconnects the microphone 118 to the electronic signal processor 130 and the electronic signal processor 130 to the speaker 138. The various controls 124, induction coil 144, and the battery 146 are also communicatively interconnected to the electronic signal processor 130 by the signaling architecture. The speaker 138 projects sound and in particular, acoustic signals in the audio frequency band as processed by the hearing aid 10. The various controls 124 may include a programming connector 140 and hearing aid controls 142. By way of example, the programming connector 140 may provide an interface to a computer or other device. The hearing aid controls 142 may include an ON/OFF switch as well as volume controls, for example. The battery 146 provides power to the hearing aid and may be rechargeable or accessed through a battery compartment door (not shown), for example. The induction coil 144 may receive magnetic field signals in the audio frequency band from a telephone receiver or a transmitting induction loop, for example, to provide a telecoil functionality. The induction coil 144 may also be utilized to receive remote control signals encoded on a transmitted or radiated electromagnetic carrier, with a frequency above the audio band. Various programming signals from a transmitter may also be received.

The various controls 124 presented above are exemplary and it should be appreciated that other types of controls may be incorporated in the hearing aid 10. Moreover, the electronics and form of the hearing aid 10 may vary. The hearing aid 10 and associated electronics may include any type of headphone configuration, a behind-the ear configuration, an in-the-ear configuration, or in-the-ear configuration, for example. Further, as alluded, electronics configurations with multiple microphones for directional hearing are within the teachings presented herein.

Referring again to FIG. 4, in one embodiment, the electronic signal processor 130 may be programmed with a preferred hearing range which, in one embodiment, is the preferred hearing sound range corresponding to highest hearing capacity of a patient. The preferred hearing sound range may be an about 10 Hz to an about 30 Hz frequency range. In one implementation, the preferred hearing sound range is about a 20 Hz frequency range. With this approach, the hearing capacity of the patient is enhanced. Typical audiogram hearing aid industry testing equipment measures hearing capacity at defined frequencies, such as 60 Hz; 125 Hz; 250 Hz; 500 Hz; 1,000 Hz; 2,000 Hz; 4,000 Hz; 8,000 Hz and typical hearing aids work on a ratio-based frequency scheme. The present teachings however measure hearing capacity at a small step, such as 10 Hz. Thereafter, one or a few, such as three, frequency ranges are defined that are about 10 Hz to about wide to serve as the preferred hearing range or preferred hearing ranges.

Further, in one embodiment, the controls 124 may include an adjustment that widens the about 10 Hz to an about 30 Hz frequency range to frequency range of 100 Hz or even wider, for example. Further, the preferred hearing sound range may be shifted by use of controls 124. Directional microphone systems and processing may be included that provides a boost to sounds coming from the front of the patient and reduce sounds from other directions. Such a directional microphone system and processing may improve speech understanding in situations with excessive background noise. Digital noise reduction, impulse noise reduction, and wind noise reduction may also be incorporated. System compatibility features, such as FM compatibility and Bluetooth compatibility, may be included in the hearing aid 10.

The processor may process instructions for execution within the electronic signal processor 130 as a computing device, including instructions stored in the memory. The memory stores information within the computing device. In one implementation, the memory is a volatile memory unit or units. In another implementation, the memory is a non-volatile memory unit or units. The memory is accessible to the processor and includes processor-executable instructions that, when executed, cause the processor to execute a series of operations. The processor-executable instructions cause the processor to receive an input analog signal from the microphone 118 and convert the input analog signal to a digital signal. The processor-executable instructions then cause the processor to transform through compression, for example, the digital signal into a processed digital signal having the preferred hearing range. The processor is then caused by the processor-executable instructions to convert the processed digital signal to an output analog signal and drive the output analog signal to the speaker 138.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for aiding hearing, the system comprising:

a programming interface configured to communicate with a device, the device including a housing securing a microphone, a speaker, a user interface, a processor, non-transitory memory, and storage therein, the device including a busing architecture communicatively interconnecting the microphone, the speaker, the user interface, the processor, the non-transitory memory, and the storage;

the non-transitory memory accessible to the processor, the non-transitory memory including first processor-executable instructions that, when executed, by the processor cause the system to:

program the processor with a plurality of preferred hearing ranges, the plurality of preferred hearing ranges being respective frequency ranges of sound corresponding to a hearing capacity of a patient; and the non-transitory memory accessible to the processor, the non-transitory memory including second processor-executable instructions that, when executed, by the processor cause the system to:

receive an isolated input analog signal, convert the isolated input analog signal to a digital signal, transform through compression the digital signal into a processed digital signal having the plurality of preferred hearing ranges, convert the processed digital signal to an output analog signal, and drive the output analog signal to the speaker.

2. The system as recited in claim 1, wherein at least one of the plurality of preferred hearing ranges further comprises a 10 Hz frequency to a 50 Hz frequency range.

3. The system as recited in claim 1, wherein at least one of the plurality of preferred hearing ranges further comprises a 10 Hz frequency to a 30 Hz frequency range.

4. The system as recited in claim 1, wherein at least one of the plurality of preferred hearing ranges further comprises a 20 Hz frequency to a 25 Hz frequency range.

5. The system as recited in claim 1, wherein at least one of the plurality of preferred hearing ranges further comprises a frequency range of 100 Hz wide.

6. The system as recited in claim 1, wherein the microphone is configured to cooperate with a second microphone to provide directional hearing.

7. The system as recited in claim 1, wherein the device further comprises an ear mold form being sized to fit a physical shape of an ear of the patient.

8. The system as recited in claim 1, wherein the device further comprises controls that allow the patient to adjust the width of at least one of the plurality of preferred hearing ranges.

9. The system as recited in claim 1, wherein the non-transitory memory further includes third processor-executable instructions that, when executed by the processor, enable the user interface to present controls to the patient, allowing the patient to adjust the width of at least one of the plurality of preferred hearing ranges.

10. The system as recited in claim 9, wherein the noise reduction features further comprise a feature selected from the group consisting of digital noise reduction, impulse noise reduction, and wind noise reduction.

11. The system as recited in claim 1, wherein the device further comprises noise reduction features.

12. The system as recited in claim 1, wherein the second processor-executable instructions further comprise instructions that, when executed by the processor, apply additional signal processing to enhance the clarity of the processed digital signal prior to converting the processed digital signal to the output analog signal.

13. The method of claim 1, wherein at least one of the plurality of preferred hearing ranges is about a 10 Hz frequency to an about 50 Hz frequency range.

14. The method of claim 1, wherein at least one of the plurality of preferred hearing ranges is about a 10 Hz frequency to an about 30 Hz frequency range.

15. The method of claim 1, wherein at least one of the plurality of preferred hearing ranges has a width of about 100 Hz.

16. The method of claim 1, further comprising receiving input from a second microphone of the device to provide directional hearing.

17. The method of claim 1, further comprising adjusting the width of at least one of the plurality of preferred hearing ranges based on user input received through a user interface of the device.

18. The method of claim 1, further comprising applying noise reduction techniques to the digital signal prior to compression, wherein the noise reduction techniques include at least one of digital noise reduction, impulse noise reduction, and wind noise reduction.

19. A system for aiding hearing, the system comprising:

a programming interface configured to communicate with a device, the device including a housing securing a microphone, a speaker, a user interface, a processor, non-transitory memory, and storage therein, the device including a busing architecture communicatively interconnecting the microphone, the speaker, the user interface, the processor, the non-transitory memory, and the storage;

the non-transitory memory accessible to the processor, the non-transitory memory including first processor-executable instructions that, when executed, by the processor cause the system to:

program the processor with a preferred hearing range of about 10 Hz frequency to an about 30 Hz frequency range of sound corresponding to the highest hearing capacity of a patient;

the non-transitory memory accessible to the processor, the non-transitory memory including second processor-executable instructions that, when executed, by the processor cause the system to:

receive an isolated input analog signal from the microphone which cooperates with a second microphone to provide directional hearing, convert the isolated input analog signal to a digital signal, transform through compression the digital signal into a processed digital signal having the plurality of preferred hearing range, apply digital noise reduction to the processed digital signal to enhance clarity, convert the processed digital signal to an output analog signal, and drive the output analog signal to the speaker.

20. A method for aiding hearing using a device, the method comprising:

programming a processor of the device with a plurality of preferred hearing ranges, the plurality of preferred hearing ranges being respective frequency ranges of sound corresponding to a hearing capacity of a patient;

receiving an isolated input analog signal via a microphone of the device;

converting the isolated input analog signal to a digital signal;

transforming the digital signal through compression to produce a processed digital signal having the plurality of preferred hearing ranges;

converting the processed digital signal to an output analog signal; and driving the output analog signal to a speaker of the device for playback.

* * * * *